US011972918B1

(12) United States Patent
Wan et al.

(10) Patent No.: US 11,972,918 B1
(45) Date of Patent: Apr. 30, 2024

(54) TWO-SECTION CONDUCTOR TYPE GROUND FAULT CIRCUIT INTERRUPTER WITH REVERSE WIRING PROTECTION FUNCTION

(71) Applicant: WENZHOU FAHINT ELECTRIC CO., LTD, Wenzhou (CN)

(72) Inventors: Shangbing Wan, Wenzhou (CN); Yuejian Lu, Wenzhou (CN)

(73) Assignee: WENZHOU FAHINT ELECTRIC CO., LTD, Wenzhou (CN)

( * ) Notice: Subject to any disclaimer, the term of this patent is extended or adjusted under 35 U.S.C. 154(b) by 0 days.

(21) Appl. No.: 18/363,761

(22) Filed: Aug. 2, 2023

(30) Foreign Application Priority Data

Jul. 20, 2023 (CN) ........................ 202310895020.9

(51) Int. Cl.
*H01H 71/12* (2006.01)
*H01H 71/58* (2006.01)
*H01H 83/02* (2006.01)

(52) U.S. Cl.
CPC .......... *H01H 71/123* (2013.01); *H01H 71/58* (2013.01); *H01H 83/02* (2013.01)

(58) Field of Classification Search
CPC ............... H01H 13/14; H01H 2235/01; H01H 71/0207; H01H 71/123; H01H 71/128; H01H 71/2463; H01H 71/505; H01H 71/521; H01H 71/58; H01H 83/02; H01R 13/7135; H01R 24/78; H02H 3/07; H02H 3/16; H02H 3/335; H02H 3/338
USPC ........................................................ 361/42
See application file for complete search history.

(56) References Cited

U.S. PATENT DOCUMENTS

| | | | | |
|---|---|---|---|---|
| 5,933,063 A * | 8/1999 | Keung | H01H 83/20 335/265 |
| 6,433,555 B1 * | 8/2002 | Leopold | H01H 83/04 324/509 |
| 2016/0358733 A1 | 12/2016 | Pan et al. | |
| 2017/0047726 A1 | 2/2017 | Pan et al. | |
| 2018/0061605 A1 * | 3/2018 | Huang | H01R 13/7135 |
| 2022/0310333 A1 | 9/2022 | Chen et al. | |

FOREIGN PATENT DOCUMENTS

| | | | |
|---|---|---|---|
| CN | 1549292 A | | 11/2004 |
| CN | 1744253 A | | 3/2006 |
| CN | 200993948 Y | | 12/2007 |
| CN | 103268844 A | | 8/2013 |
| CN | 204651264 U | | 9/2015 |
| CN | 105304425 A | | 2/2016 |
| CN | 105590807 A | | 5/2016 |
| CN | 105609382 A | | 5/2016 |
| CN | 213815948 U | | 7/2021 |
| CN | 215600321 | | 1/2022 |
| CN | 215600321 U | * | 1/2022 |

* cited by examiner

*Primary Examiner* — Jared Fureman
*Assistant Examiner* — Nicolas Bellido

(57) ABSTRACT

Disclosed is a two-section conductor type ground fault circuit interrupter with a reverse wiring protection function. A patch key switch is arranged on a PCBA assembly, a conduction spring is mounted between an electric plug bush and the PCBA assembly, and an electronic relay is mounted between an output end of a load copper sheet and the conduction spring. A condition that a metal key is exposed to generate a spark or a metal press piece falls off is avoided, so a two-section conductor structure with the reverse wiring protection function is achieved.

3 Claims, 4 Drawing Sheets

TWO-SECTION CONDUCTOR TYPE GROUND FAULT CIRCUIT INTERRUPTER WITH REVERSE WIRING PROTECTION FUNCTION

BACKGROUND OF THE INVENTION

1. Technical Field

The present invention relates to the technical field of breakers, and particularly relates to a two-section conductor type ground fault circuit interrupter with a reverse wiring protection function.

2. Description of Related Art

China National Intellectual Property Administration has disclosed a ground fault circuit interrupter (publication number: CN215600321U) on 21 Jan. 2022, which primarily consists of a shell 300, a PCBA assembly 600, a springboard combined part 700, a hook assembly 100, a reset assembly 200, an insulation center stand 400 and an electrical plug bush 500. Two load copper sheets 620 are arranged on the PCBA assembly 600, and the electrical plug bush 500 is arranged between the insulation center stand 400 and an upper stand 320.

With respect to the two load copper sheets, one in and one out, for example, 620 IN and 620 OUT in FIG. 8, each of the two load copper sheets 620 and the electrical plug bush 500 form a conductor section independently, so as to form a three-section conductor type structure. When the reset assembly 200 is pressed, the hook assembly 100 pulls the springboard combined part 700 upwards, so one group of silver points in two groups of silver points of the springboard combined part 700 are connected with silver points of the load copper sheet 620 OUT, and the other group of silver points are connected with silver points of the electrical plug bush 500 OUT. Therefore, the load copper sheet 620 IN as an input end and the load copper sheet 620 OUT and the electrical plug bush 500 OUT as output ends are connected.

The structure has the following main problems: (1) the three-section conductor type structures does not have the reverse wiring protection function; (2) a reset press piece 730 is arranged at the lower end of the springboard combined part 700, a first wiring terminal 630 and a second wiring terminal 640 are arranged on the PCBA assembly 600, and when the reset press piece 730 is pressed to move downwards, the reset contact piece 730 is in contact with the first wiring terminal 630 and the second wiring terminal 640 to electrify so as to generate a magnetic force; in such resetting operation mode of copper contact type or metal press piece type contact, a spark is easily generated or the metal press piece falls off, which results in abnormality of a product or burning of the product; and (3) a lockhole 711 in the latching piece 710 is rectangular, the lower end of a hook support 130 is inserted into the lockhole 711, and in a working state of the product, the hook piece 131 on the hook support 130 is locked by the lockhole 711; once vibration occurs, the hook piece 131 may be separated from the lockhole 711 in the latching piece 710, which results in mis-trip.

BRIEF SUMMARY OF THE INVENTION

To solve the problems in the prior art, the present invention is intended to provide a two-section conductor type ground fault circuit interrupter with a reverse wiring protection function.

To achieve the above object, the present invention provides a two-section conductor type ground fault circuit interrupter with a reverse wiring protection function, including a shell, a PCBA (Printed Circuit Board Assembly) assembly, a springboard combined part, a hook assembly, a reset assembly, an insulation center stand and an electrical plug bush, wherein two load copper sheets are arranged on the PCBA assembly, one in and one out, and the electrical plug bush is arranged between the insulation center stand and an upper stand; a patch key switch is arranged on the PCBA assembly, and is located right below the springboard combined part, and when the reset assembly is pressed, a plastic end socket of the springboard combined part can be in contact with the patch key switch to be reset; and a conduction spring is mounted between the electric plug bush and the PCBA assembly, and an electronic relay is mounted between an output end of each of the load copper sheets and the conduction spring.

As a preferred option of the above solution, the springboard combined part includes a latching piece with a lockhole; the hook assembly includes a hook support with a hook piece; the opening width of the lockhole is reduced in a direction from a side away from a lock catch to a side close to the lock catch, and a semi-circular opening is formed at a narrow opening as a locking position for preventing the hook piece of the hook support from tripping from the locking position.

Further preferably, a wide opening of the lockhole is a rectangular section, and the semi-circular opening is communicated with the rectangular section through an isosceles trapezoid section.

Further preferably, the conduction spring is a cylindrical helical compression spring.

The present invention has the following beneficial effects:

(1) The patch key switch on the PCBA assembly in contact with the plastic end socket of the springboard combined part to reset, so as to replace the first wiring terminal, the second wiring terminal and the reset press piece in an existing structure, so it is guaranteed that the product works reliably, the risk of exposing the metal key is avoided, and a condition that the product is abnormal or is burnt as the metal key of the ground fault circuit interrupter is exposed to generate a spark or the metal press piece thereof falls off is avoided;

(2) The conduction spring is additionally arranged between the electrical plug bush and the PCBA assembly, and the electronic relay is additionally arranged between the output end of each of the load copper sheet and the conduction spring, so that the load copper sheet as the output end is connected to the electrical plug bush through the conduction spring to form a conductor, and then forms a two-section conductor type structure with the load copper sheet as the input end; a fixed thinking that a conventional ground fault circuit interrupter has to use a three-section conductor structure is abandoned, and a new structure breakthrough of the two-section conductor type ground fault circuit interrupter with the reverse wiring protection function is achieved;

(3) by taking the cylindrical helical compression spring as the conduction spring, the load copper sheet as the output end and the electrical plug bush are conducted on the premise of ensuring a normal pressing operation of the ground fault circuit interrupter, with a quite ingenious design; and (4) The novel lockhole structure is adopted, which can not only prevent the hook piece of the hook support from tripping from the locking position, but also ensure convenient and rapid installation.

In conclusion, the present invention features simple structure, skillful design, safe and reliable use and convenient and rapid installation.

DETAILED DESCRIPTION OF THE INVENTION

Figure 1:
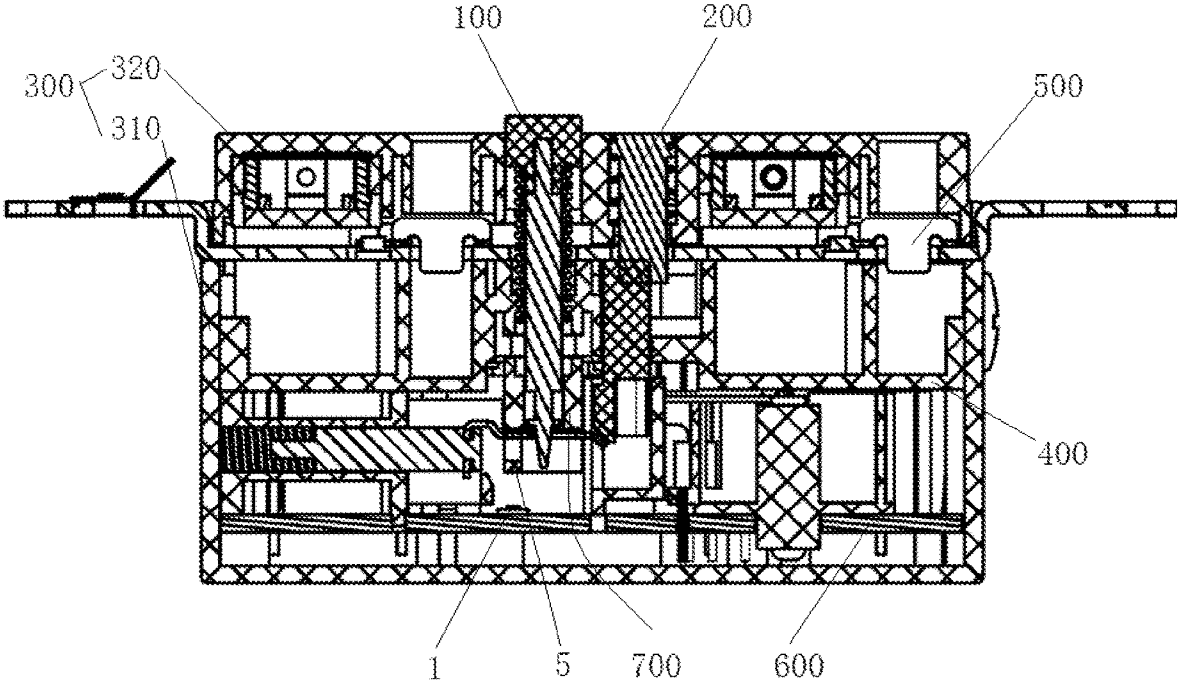
FIG. 1 is a section view of the present invention.
Figure 2:
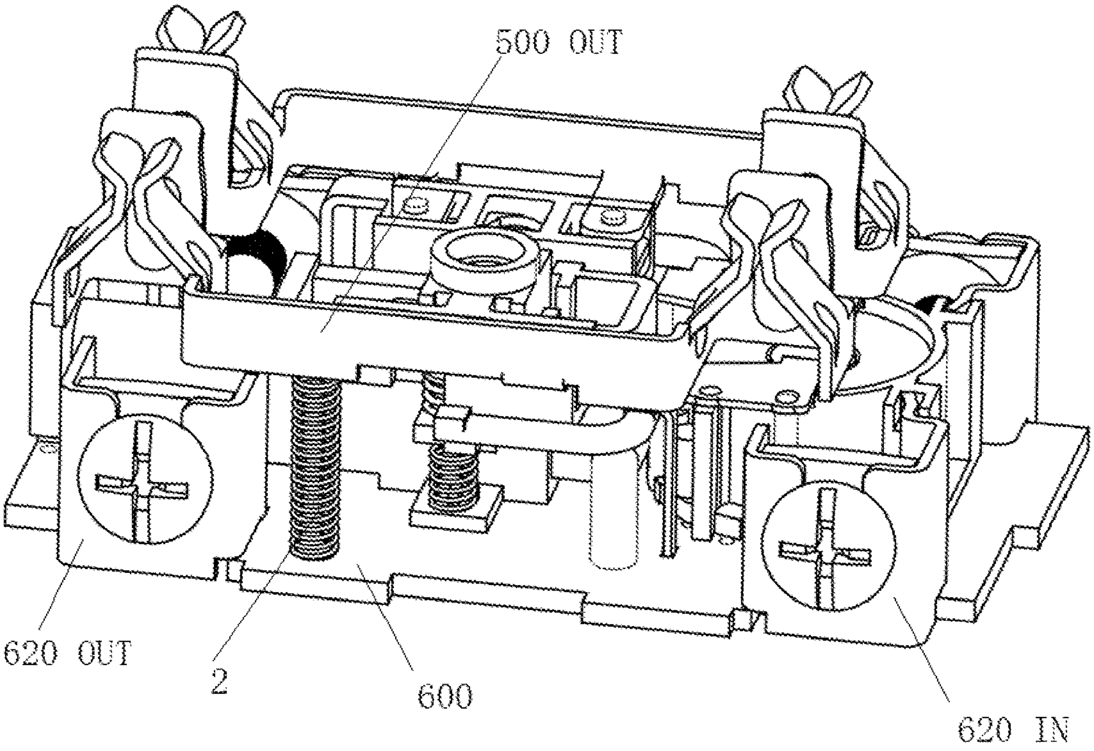
FIG. 2 is a three-dimensional diagram I of the present invention.
Figure 3:
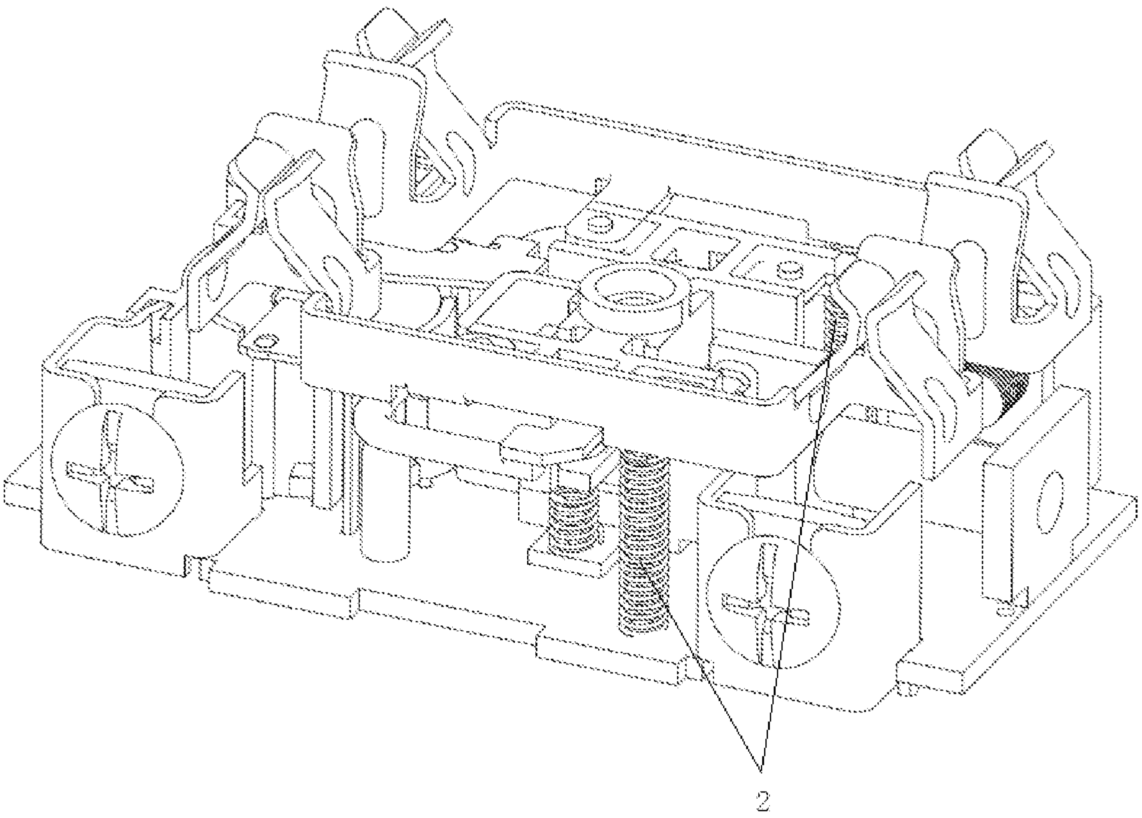
FIG. 3 is a three-dimensional diagram II of the present invention.
Figure 4A:
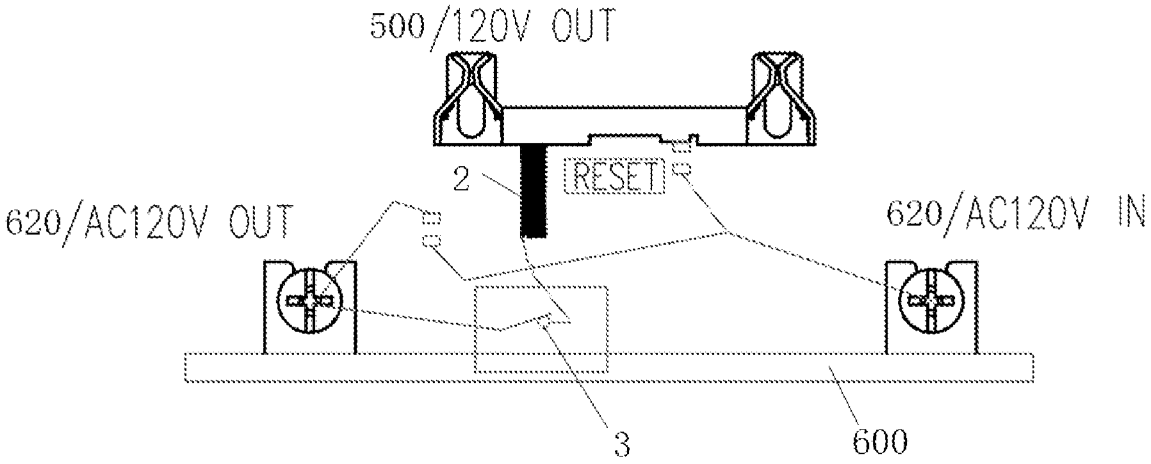
FIG. 4A is a schematic diagram of a circuit where an electrical plug bush, a conduction spring and load copper sheets are conducted or disconnected through an electronic relay.
Figure 4B:
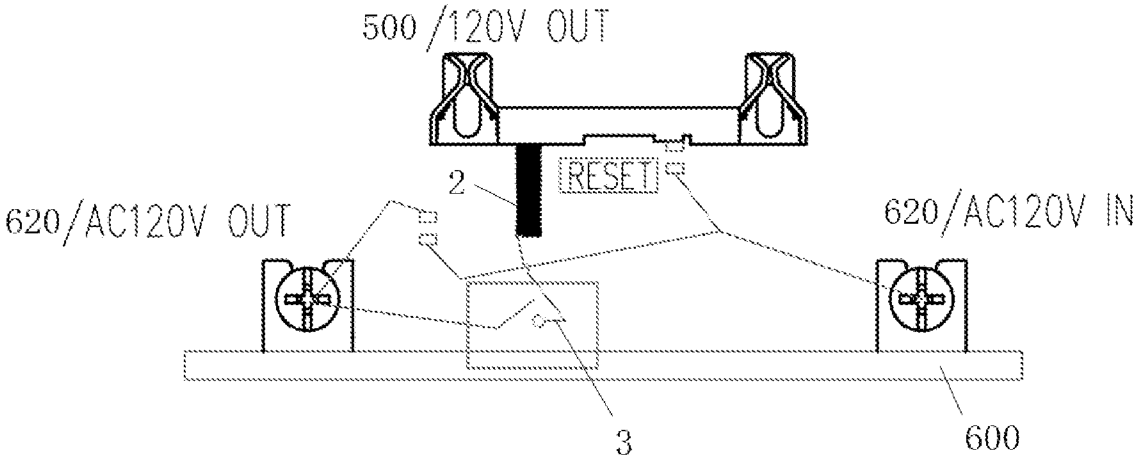
FIG. 4B is a schematic diagram of a circuit where an electrical plug bush, a conduction spring and load copper sheets are conducted or disconnected through an electronic relay.
Figure 5:
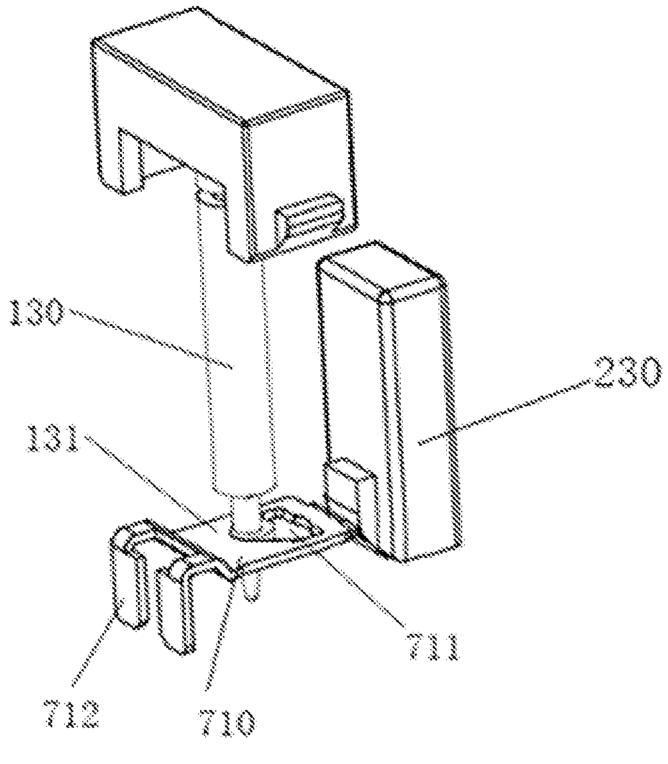
FIG. 5 shows a state of a hook piece on a hook support above a lockhole of a latching piece.
Figure 6:
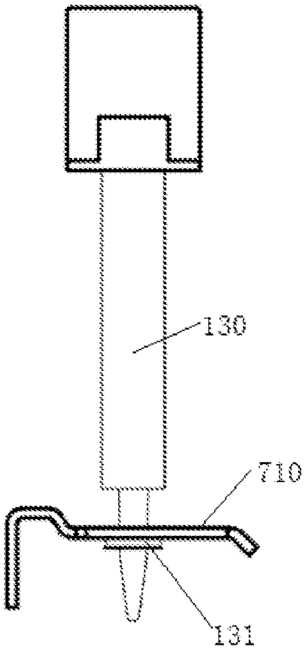
FIG. 6 shows a state of the hook piece on the hook support locked the lockhole of the latching piece.
Figure 7:
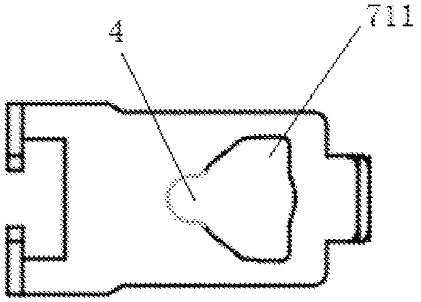
FIG. 7 is a top view of the lockhole in the latching piece.
Figure 8:
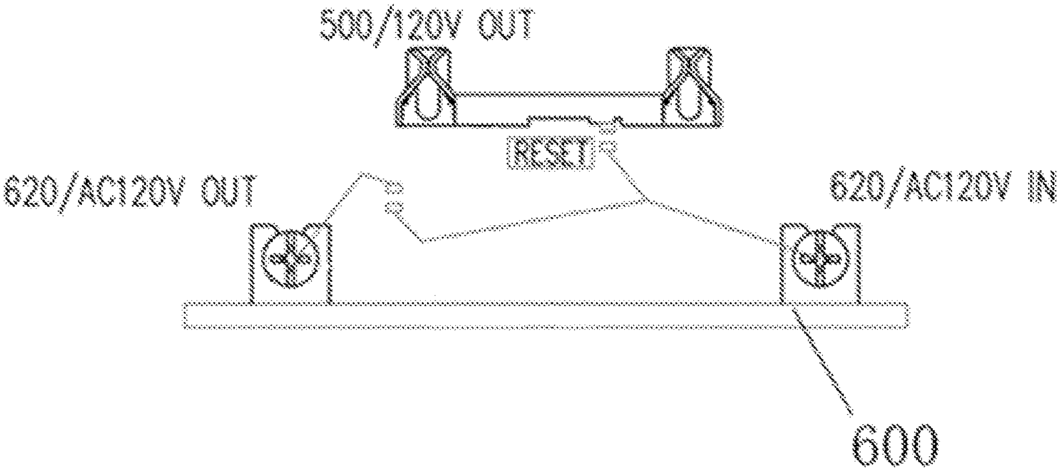
FIG. 8 prior art
FIG. 8 is a schematic diagram of a circuit of a ground fault circuit interrupter in the background art.

As shown in FIGS. 1-7, a two-section conductor type ground fault circuit interrupter with a reverse wiring protection function primarily consists of a shell 300, a PCBA assembly 600, a springboard combined part 700, a hook assembly 100, a reset assembly 200, an insulation center stand 400 and an electrical plug bush 500. The shell 300 includes a base 310 and an upper stand 320, and the upper stand 320 is detachably connected to the base 310.

Two load copper sheets 620 are arranged on the PCBA assembly 600, one in and one out, and the electrical plug bush 500 is arranged between the insulation center stand 400 and an upper stand 320. The above is consistent with the structure disclosed in CN215600321U, which is not described in detail herein. It is needed to cancel the first wiring terminal 630 and the second wiring terminal 640 arranged on the PCBA assembly 600, and the reset press piece 730 at the lower end of the springboard combined part 700 as well in CN215600321U.

As a replacing structure, the patch key switch 1 is additionally arranged on the PCBA assembly 600 and is located right below the springboard combined part 700. When the reset assembly 200 is pressed, the plastic end socket 5 of the springboard combined part 700 can be in contact with the patch key switch 1, so the springboard combined part is reset. The springboard combined part 700 is reset in a manner that the plastic end socket 5 is in contact with the patch key switch 1, so it is guaranteed that the product works reliably, the risk of exposing the metal key is avoided, and a condition that the product is abnormal or is burnt as the metal key of the ground fault circuit interrupter is exposed to generate a spark or the metal press piece thereof falls off is avoided.

A conduction spring 2 is mounted between the electric plug bush 500 and the PCBA assembly 600, and an electronic relay 3 is mounted between an output end of each of the load copper sheets 620 and the conduction spring 2. With respect to the two load copper sheets 620, one in and one out (620 IN and 620 OUT in FIG. 4), the load copper sheet 620 OUT as the output end is connected to the electrical plug bush 500 through the conduction spring 2 to form a conductor, and then forms a two-section conductor structure with the load copper sheet 620 IN as the input end. When the reset assembly 200 is pressed, the hook assembly 100 pulls the springboard combined part 700 upwards, so one group of silver points in two groups of silver points of the springboard combined part 700 are connected with silver points of the load copper sheet 620 OUT, and the other group of silver points are connected with silver points of the electrical plug bush 500 OUT. Therefore, the load copper sheet 620 IN as an input end and the load copper sheet 620 OUT and the electrical plug bush 500 OUT as output ends are connected.

As the load copper sheet 620 OUT and the electrical plug bush 500 are connected by the conduction spring 2 after normal electrification, the product is reset after the reset assembly 200 is pressed, and the load copper sheet 620 OUT and the electrical plug bush 500 can supply power normally. However, in case of reverse wiring (that is, the load copper sheet 620 OUT and the load copper sheet 620 IN are reversely connected), the electronic relay 3 between the output end of the load copper sheet 620 and the conduction spring 2 is triggered to disconnect the output end of the load copper sheet 620 from the electrical plug bush 500, so that the reset assembly 200 cannot be reset. There is no electricity outputted at the output end of the load copper sheet 620 and the output end of the electrical plug bush 500, so that the reverse wiring protection function is realized.

The conduction spring 2 is most preferably a cylindrical helical compression spring, which does not affect the normal pressing operation of the whole ground fault circuit interrupter.

The springboard combined part 700 includes a latching piece 710 with a lockhole 711, and the hook assembly 100 includes a hook support 130 with a hook piece 131, which is the same with those in the prior art. Most preferably, the opening width of the lockhole 711 is reduced in a direction from a side away from a lock catch 712 to a side close to the lock catch 712, and a semi-circular opening 4 is formed at a narrow opening as a locking position for preventing the hook piece 131 of the hook support 130 from tripping from the locking position. According to such a structural arrangement, the hook piece 131 of the hook support 130 enters from the wide opening and is locked at the narrow opening conveniently during installation. The semi-circular opening is formed at the locking position, so the hook and the latch are kept in a balanced state during work, and it is ensured that mis-trip of the product due to vibration in the working state is prevented. The ground fault circuit interrupter has a forced trip function as well thanks to a mechanical mechanism. When the product works normally, it can be tripped in a mechanical pushing manner in any state, so the electricity consumption safety is ensured. After the product is locked, it is only needed to press the reset supporting piece 230 lightly to move the latch leftwards and release the hook piece, so the product can be powered off.

Further preferably, a wide opening of the lockhole 711 is a rectangular section, and the semi-circular opening 4 is communicated with the rectangular section through an isosceles trapezoid section.

The specific structures not mentioned in the patent document are subject to the structures disclosed in CN215600321U.

What is claimed is:

1. A two-section conductor type ground fault circuit interrupter with a reverse wiring protection function, comprising a shell (300), a PCBA (Printed Circuit Board Assembly) assembly (600), a springboard combined part (700), a hook assembly (100), a reset assembly (200), an insulation center stand (400) and an electrical plug bush (500), wherein two load copper sheets (620) are arranged on the PCBA assembly (600), one in and one out, and the electrical plug bush (500) is arranged between the insulation center stand (400) and an upper stand (320);

a patch key switch (1) is arranged on the PCBA assembly (600), and is located right below the springboard combined part (700), and when the reset assembly (200) is pressed, a plastic end socket of the springboard combined part (700) can be in contact with the patch key switch (1), so the springboard combined part is reset; and a conduction spring (2) is mounted between the electric plug bush (500) and the PCBA assembly (600), and an electronic relay (3) is mounted between an output end of each of the load copper sheets (620) and the conduction spring (2); and the springboard combined part (700) comprises a latching piece (710) with a lockhole (711); the hook assembly (100) comprises a hook support (130) with a hook piece (131); the opening width of the lockhole (711) is reduced in a direction from a side away from a lock catch (712) to a side close to the lock catch (712), and a semi-circular opening (4) is formed at a narrow opening as a locking position for preventing the hook piece (131) of the hook support (130) from tripping from the locking position.

2. The two-section conductor type ground fault circuit interrupter with the reverse wiring protection function according to claim 1, wherein a wide opening of the lockhole (711) is a rectangular section, and the semi-circular opening (4) is communicated with the rectangular section through an isosceles trapezoid section.

3. The two-section conductor type ground fault circuit interrupter with the reverse wiring protection function according to claim 1, wherein the conduction spring (2) is a cylindrical helical compression spring.

* * * * *